H. D. BROWN.
Sheep Stock.
No. 77,866.   Patented May 12, 1868.
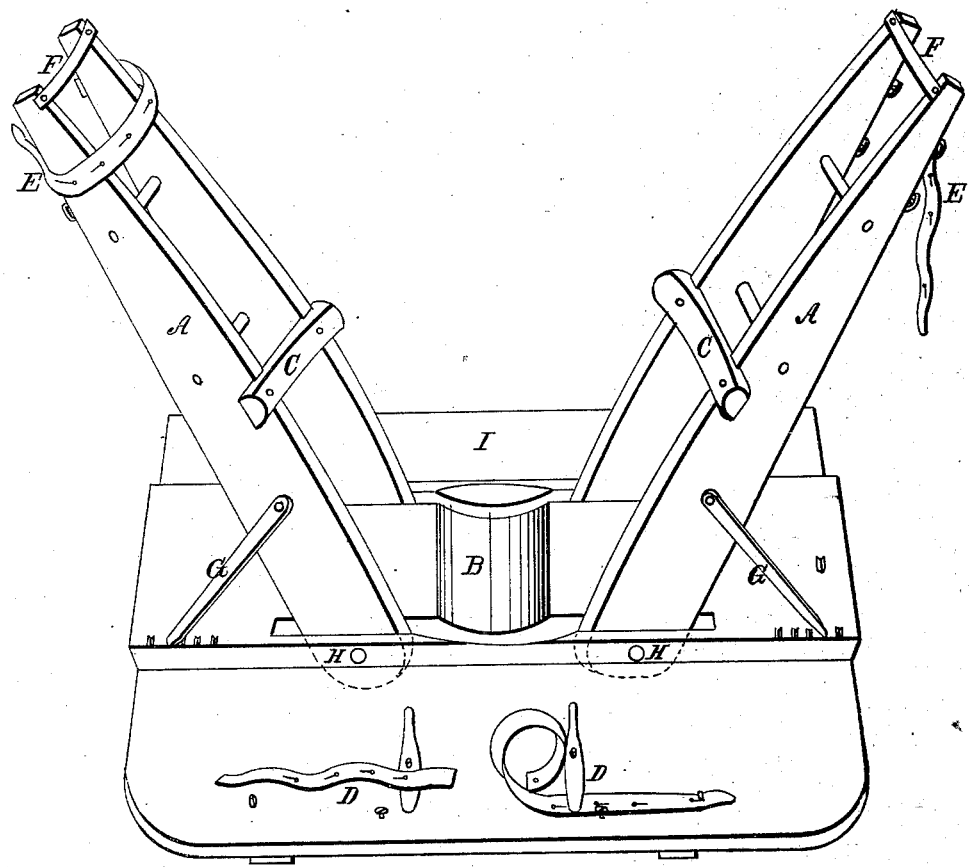
Witnesses:
Henry C. Carr
He. C. Piatt
Inventor:
Henry D Brown

United States Patent Office.

HENRY D. BROWN, OF TIPTON, IOWA.

Letters Patent No. 77,866, dated May 12, 1868; antedated April 25, 1868.

IMPROVEMENT IN SHEEP-SHEARING CHAIR.

*The Schedule referred to in these Letters Patent and making part of the same.*

TO ALL WHOM IT MAY CONCERN:

Be it known that I, HENRY D. BROWN, of Tipton, in the county of Cedar, and State of Iowa, have invented a new and useful machine for holding and fastening sheep while shearing, which I call "H. D. Brown's Sheep-Shearing Chair;" and I do hereby declare that the following is a clear, full, and exact description of the construction and operation of the same, reference being had to the annexed drawings, making a part of this specification.

The annexed drawing is a perspective view of the machine.

A A are racks, which support the sheep in position while shearing, one side of the sheep shearing while it is fastened to one rack, and the other side while it is fastened to the other.

These racks turn upon the pins H H, and may be varied in their position, to suit the convenience of the shearer. They are secured in their position by the braces G G, which prevent the rack from going lower or taking a more horizontal position than is desirable. The weight of the sheep holds the brace firmly in the notch.

C C are bolsters, which throw out the side of the sheep, and prevent the skin from wrinkling.

B is a hollow in the chair, in which the buttocks of the sheep rest, thus enabling the shearer to clear away from the hind parts of the sheep with less trouble than would be experienced without it.

D D are straps, which secure the hind legs of the sheep by winding around the legs, and passing the pins through a hole in the straps.

E E are straps, which secure the head of the sheep and keep it still.

F F are straps, upon which the head of the sheep rests, which are easier for the head than wood.

I represents the position of the shearer.

What I claim as my invention, and desire to secure by Letters Patent, is—

Oscillating-racks for sheep-shearing chairs, adjusted and fastened by braces, with a bolster attached to throw out the side of the sheep, and prevent the skin from wrinkling.

I also claim the manner of fastening the hind legs of sheep by means of straps and pins, as shown in the drawings.

HENRY D. BROWN.

Witnesses:
HENRY C. CARR,
SANFORD V. LANDT.